(12) United States Patent
Seo

(10) Patent No.: US 7,480,217 B2
(45) Date of Patent: Jan. 20, 2009

(54) METHOD AND APPARATUS FOR ADJUSTING TRACKING ERROR BALANCE IN AN OPTICAL DISK REPRODUCING APPARATUS

(75) Inventor: Seong Hwan Seo, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 723 days.

(21) Appl. No.: 10/958,425

(22) Filed: Oct. 6, 2004

(65) Prior Publication Data

US 2005/0094508 A1    May 5, 2005

(30) Foreign Application Priority Data

Oct. 6, 2003 (KR) .................. 10-2003-0069213
Oct. 6, 2003 (KR) .................. 10-2003-0069215

(51) Int. Cl.
*G11B 7/00* (2006.01)

(52) U.S. Cl. .................. 369/44.25; 369/44.32
(58) Field of Classification Search .................. None
See application file for complete search history.

(56) References Cited

U.S. PATENT DOCUMENTS 5,627,808 A * 5/1997 Hajjar et al. .............. 369/44.32
2003/0117912 A1* 6/2003 Yoshimi et al. .......... 369/44.28

* cited by examiner

*Primary Examiner*—Joseph Feild
*Assistant Examiner*—Joseph Haley
(74) *Attorney, Agent, or Firm*—Birch, Stewart, Kolasch & Birch, LLP

(57) ABSTRACT

A method and apparatus for adjusting tracking error balance in an optical disk reproducing apparatus are provided. The method includes pre-setting a tracking error balance for an optical recording medium and adjusting the tracking error balance during reproduction of data from the optical recording medium.

4 Claims, 6 Drawing Sheets

*RELATED ART* FIG. 1
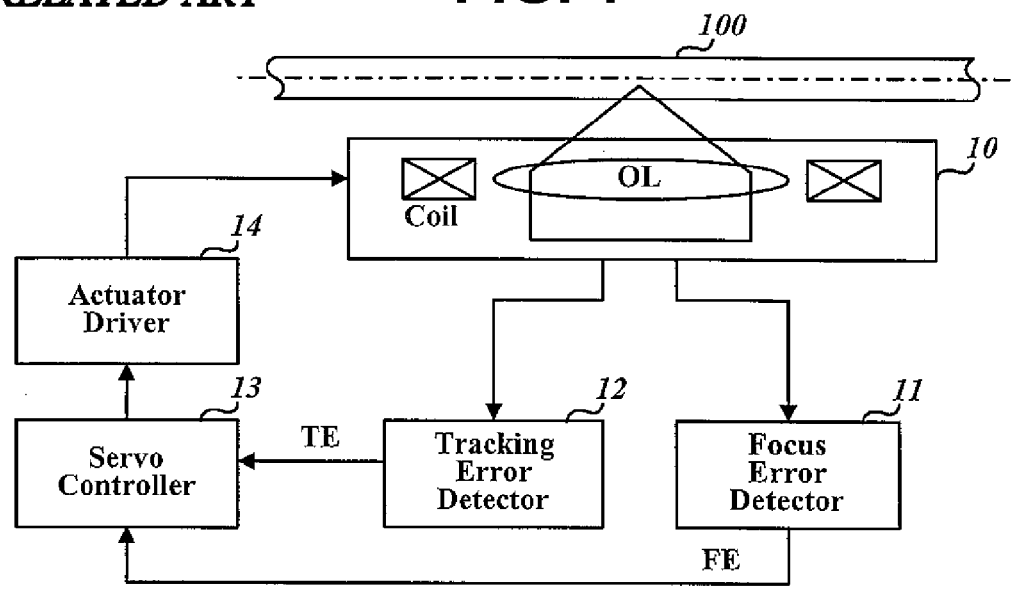
FIG. 2A
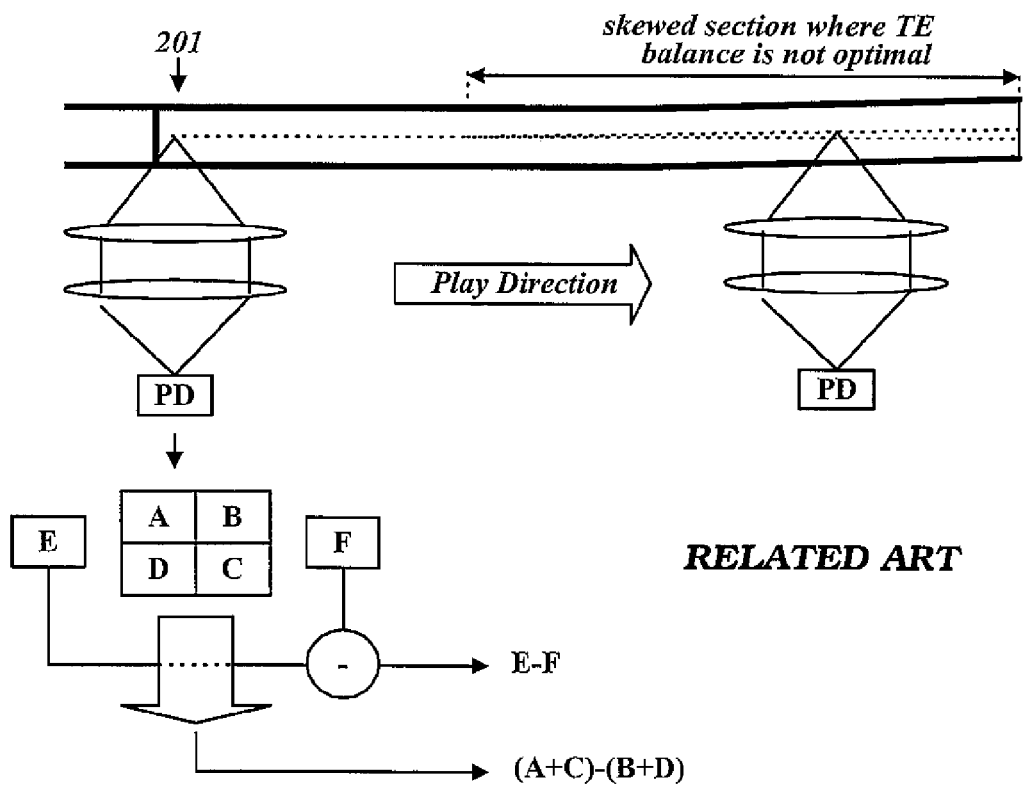
*RELATED ART*

METHOD AND APPARATUS FOR ADJUSTING TRACKING ERROR BALANCE IN AN OPTICAL DISK REPRODUCING APPARATUS

This application claims the priority benefit of Korean Patent Application No. P2003-069213 filed on Oct. 6, 2003 and No. P2003-069215 filed on Oct. 6, 2003, the entire contents of which are herein fully incorporated by reference.

BACKGROUND OF THE INVENTION

1. Field of the Invention

The present invention relates to a method and apparatus for adjusting tracking error balance, which is a reference DC level for a tracking error signal, in an optical disk reproducing apparatus during data reproduction.

2. Description of the Related Art

Optical disks capable of storing large amounts of high-quality digital video/audio data have been widely used. A disk servo system is an essential element required for reproducing data recorded on such an optical disk.

FIG. 1 illustrates a brief schematic diagram of a servo system required for a disk recorder or a disk player. The servo system comprises an optical pickup 10 for reading optical signals from an optical disk 100, a focus error detector 11 for generating a focus error (FE) signal from the signal provided by the optical pickup 10, a tracking error detector 12 for generating a tracking error (TE) signal from the signal provided by the optical pickup 10, a servo controller 13 for creating control signals based on the focus error and tracking error signals, and an actuator driver 14 for moving an objective lens (OL) installed inside the optical pickup 10 in accordance with the control signals.

If the optical disk 100 (e.g., CD or DVD) is loaded into the disk player, the servo system moves the optical pickup 10 toward a predetermined position, i.e., the innermost track 201 on the disk 100 as shown in FIG. 2A. The servo controller 13 then moves the objective lens slowly toward the disk surface to find out when to activate the focus servo. The focus servo is activated when a zero crossing of the focus error signal generated by the focus error detector 11 occurs.

After activating the focus servo, the servo controller 13 measures the peak (TE Peak) and bottom (TE Bottom) values of the tracking error signal generated by the tracking error detector 12 while tracking servo is deactivated. The mean (average) of the peak and bottom values (i.e., (TE Peak+TE Bottom)/2) is set permanently as the tracking error balance and then the tracking servo is activated.

This tracking error balance (TE_balance) is then used as an offset to the tracking error signal throughout all the reproduction operations of the optical disk 100. In other words, as shown in FIGS. 2A and 2B, the tracking error detector 12 subtracts using a subtractor 202 the offset (TE_balance) from the difference (E−F) between E and F signals generated by photodiodes (PD) and passes the result through a filter to produce a tracking drive signal TDO, thereby compensating for errors occurring due to a variation in the property of the disk or optical pickup.

The aforementioned method uses the same tracking error balance measured at the innermost track throughout all the data reproduction operations of the disk. Such one fixed tracking error balance, however, may not be appropriate for outer tracks and may act as a disturbance to the tracking error signal. If the disk is skewed or bent as shown in FIG. 2B, the use of such fixed tracking error balance is especially inappropriate because the bent property of the disk changes the amount of offset balance needed to provide an effective and accurate data reproduction operation.

SUMMARY OF THE INVENTION

In view of the shortcomings of the related art, it is an object of the present invention to provide a method and apparatus that are capable of adaptively adjusting the tracking error balance during data reproduction.

In one exemplary embodiment of the invention, the tracking error balance is adjusted based on the variation in the focus drive voltage detected during the reproduction of an optical disk.

In another exemplary embodiment of the invention, the tracking error balance is adjusted based on the tracking error signal detected during a track jump operation on an optical disk.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a brief schematic diagram of a related art servo system for an optical disk reproducing apparatus;

FIG. 2A illustrates a method for generating servo error signals and the adverse effect of a skewed disk;

DETAILED DESCRIPTION OF THE PREFERRED EMBODIMENTS

In order that the invention may be fully understood, preferred embodiments thereof will now be described with reference to the accompanying drawings.

Figure 2B:
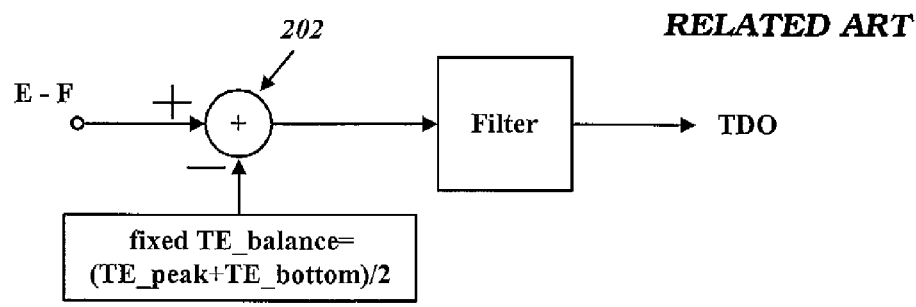
FIG. 2B illustrates a part of the servo system of FIG. 1 in which the tracking error balance remains fixed throughout the disk reproduction.
Figure 3:
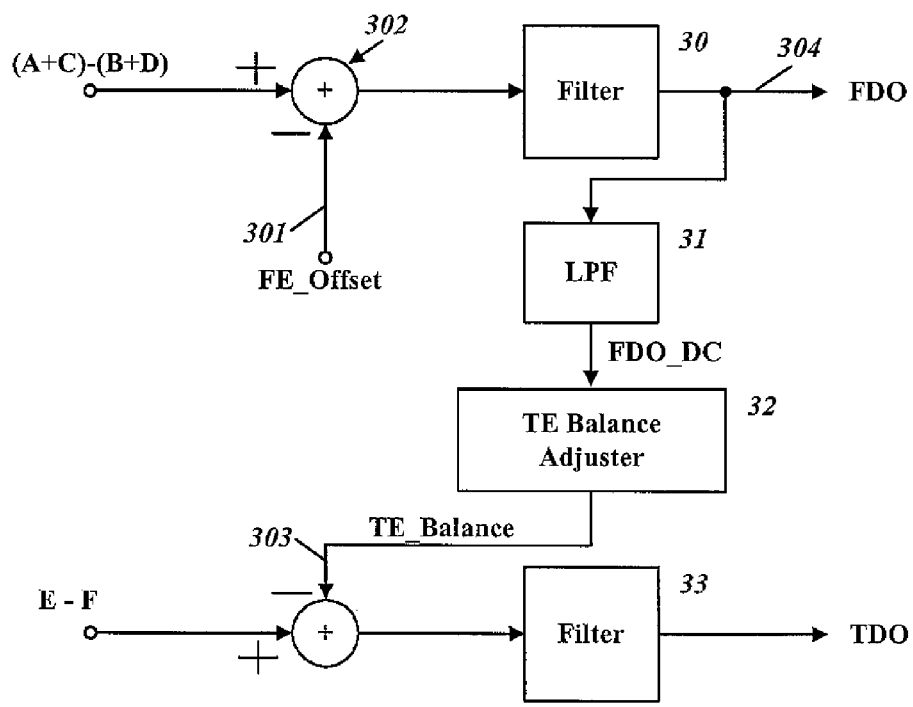
FIG. 3 illustrates a part of a tracking servo system embodying a method for adjusting tracking error balance in accordance with a first embodiment of the present invention.
Figure 4:
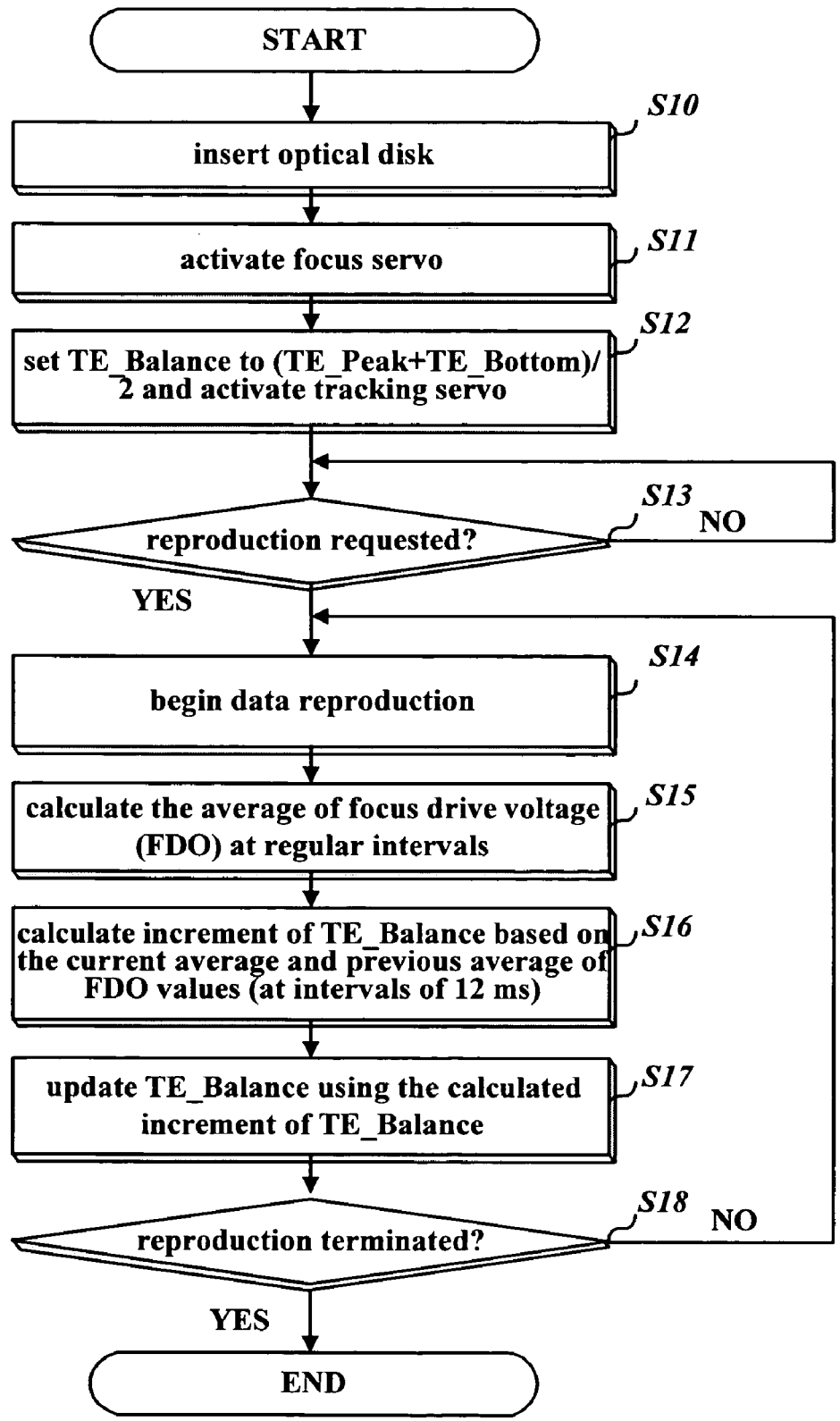
FIG. 4 illustrates a flow diagram illustrating the method for adjusting tracking error balance in accordance with the first embodiment of the present invention.

FIG. 3 illustrates a part of a tracking servo system embodying a method for adjusting tracking error balance in accordance with a first embodiment of the present invention and FIG. 4 illustrates a flow diagram illustrating this method. The tracking servo system of FIG. 3 can be part of a disk player.

Referring to FIGS. 3 and 4, if an optical disk is loaded, e.g., into a disk device (S10), a focus error offset "FE_Offset" 301 is set and subsequently the focus servo is activated (S11). The focus error offset is calculated by averaging the peak and bottom values of the S-curve measured during the zero crossing detection.

An initial tracking error balance value is obtained and set as mentioned above (S12). In other words, the initial tracking error balance "TE_Balance" is calculated as the mean of the peak and bottom values of the tracking error signal detected while only the focus servo is activated. Then the tracking servo is activated.

If reproduction of the disk begins e.g., according to a request from a user (S13 and S14), the focus servo subtracts the focus error offset from the focus error signal, i.e., (A+C)−(B+D), and sends the difference to a filter 30. Subtracting the focus error offset from the focus error signal (302) rejects the unnecessary DC component of the focus error signal. Receiving the offset-compensated error signal, the filter 30 outputs a focus drive signal FDO 304 by band-limiting and amplifying the input signal. The focus drive signal FDO 304 drives the objective lens in the optical pickup so that the offset-compensated focus error signal remains around zero.

If the optical disk is skewed, it leads to an offset in the focus error signal as the location of the objective lens moves outward. In other words, the DC component of (A+C)−(B+D) signal changes gradually due to the disk skew as the objective lens moves in the radial direction. Since the initial focus error offset value is fixed and the focus servo attempts to make the focus error signal remain around zero, the DC component of (A+C)−(B+D) signal eventually results in a DC component in the focus drive signal FDO, i.e., the output 304 of the filter 30.

After measuring the DC level (FDO_DC) of the focus drive signal FDO 304 using a low-pass filter 31, a tracking error (TE) balance adjuster 32 calculates the increment of the tracking error balance (ΔTE Bal) for compensating for the DC component of the E–F signal (S15 and S16).

To accomplish this, the TE balance adjuster 32 samples the output of the low-pass filter 31 (FDO_DC) at predetermined regular intervals (e.g., 1 ms). If the number of samplings reaches a predetermined number N (e.g., 12), the increment of the tracking error balance is calculated as follows.

If the number of samplings becomes the predetermined number N, the average of the N sampled values of FDO_DC (FDO_DC(i), i=0, 1, . . . , N−1) is calculated and then the average is subtracted from the average of N previously sampled values of FDO_DC. The increment of the tracking error balance (ΔTE Bal) is obtained by multiplying the difference by a certain coefficient (k) that was set in consideration for the system property. The optimal coefficient (k) can be determined through experiments.

Once the increment (ΔTE Bal) is obtained, the TE balance adjuster 32 updates the current tracking error balance by adding the obtained increment (ΔTE Bal) to the current tracking error balance (S17) and outputs the updated tracking error balance TE_Balance 303 to a subtractor. The subtractor subtracts the TE_Balance from the E–F signal, and the result is passed through a filter 33 to output a tracking drive signal TDO. The adjustment of the tracking error balance is repeated, e.g., periodically, as needed, or continuously, until the data reproduction is terminated (S18).

Figure 5:
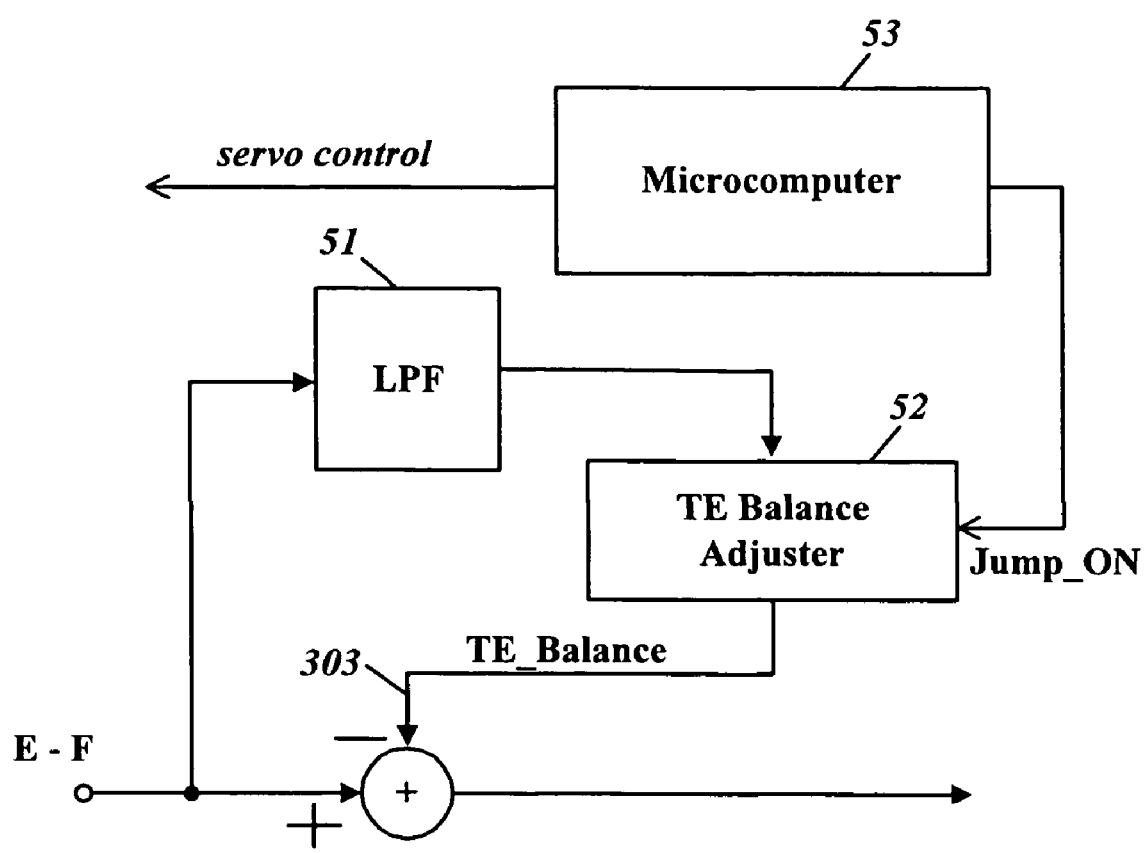
FIG. 5 illustrates a part of a tracking servo system embodying a method for adjusting tracking error balance in accordance with a second embodiment of the present invention.
Figure 6:
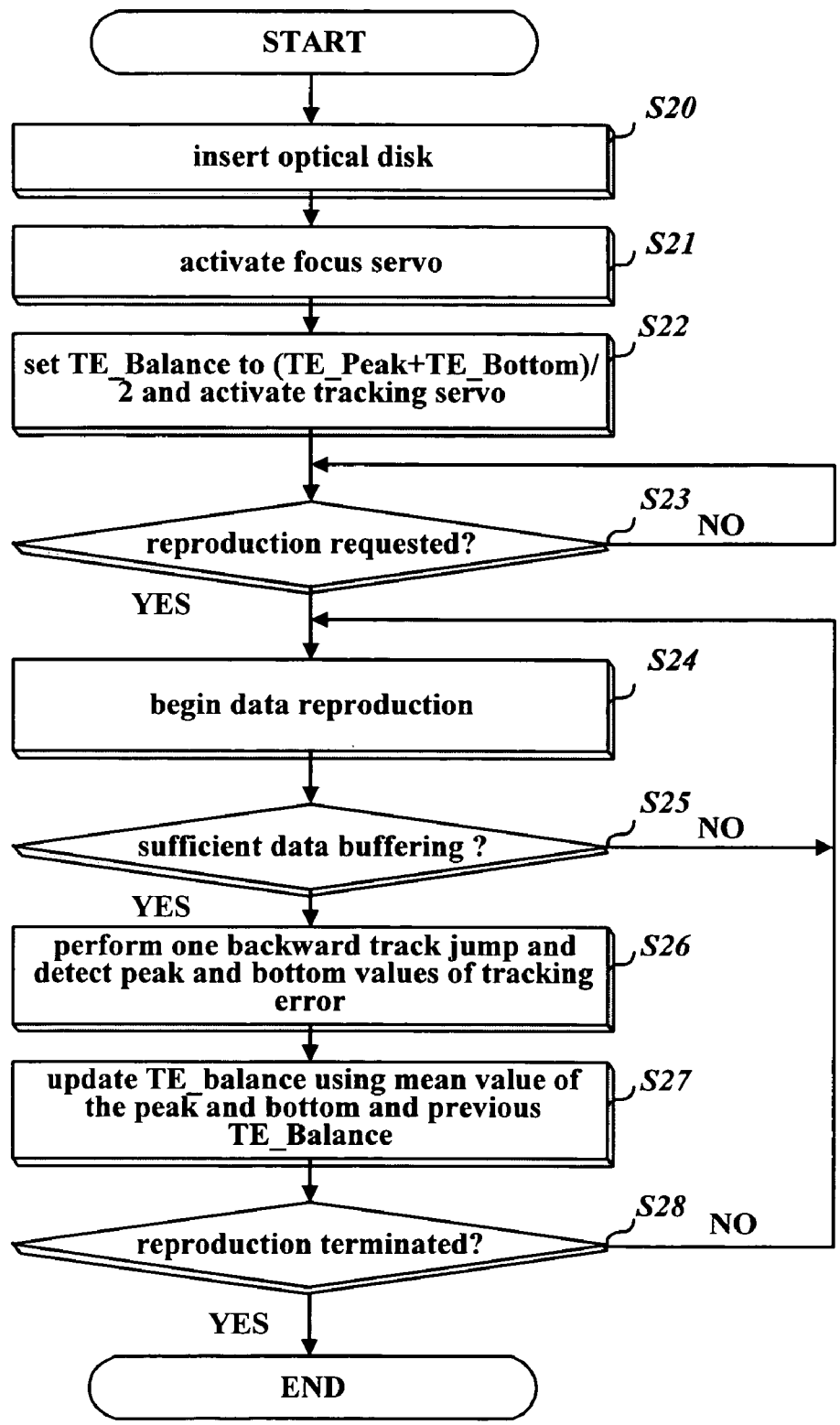
FIG. 6 illustrates a flow diagram illustrating the method for adjusting tracking error balance in accordance with the second embodiment of the present invention.

The method and apparatus for adjusting tracking error balance in accordance with a second embodiment of the present invention will now be described in detail FIG. 5 illustrates a part of a tracking servo system embodying the method of adjusting tracking error balance in accordance with the second embodiment of the present invention and FIG. 6 illustrates a flow diagram of this method.

The system in FIG. 5 comprises a low-pass filter 51 for band-limiting the E–F signal and a tracking error (TE) balance adjuster 52. The TE balance adjuster 52 may be implemented in a microprocessor 53 for controlling the overall operation of the disk reproducing apparatus.

Referring to FIGS. 5 and 6, if an optical disk is loaded into the disk device (S20), an initial tracking error balance value is set by the TE balance adjuster 52 just as done in the first embodiment in steps S11 and S12 (S21 and S22). If a request for data reproduction is received from a user (S23), the microprocessor 53 begins the reproduction of the disk (S24). During the reproduction, the tracking error balance adjustment is performed.

If data read from the optical disk is sufficiently buffered and data read can be temporarily suspended until the buffered data is outputted (S25), the microprocessor 53 performs a pause operation and provides a jump-on signal to the TE balance adjuster 52. The pause operation is achieved by one backward track jump per disk rotation, during which, the tracking servo is deactivated. The pause operation, therefore, makes the laser beam spot remain at the same position despite the rotation of the disk. After one track backward jump, the tracking servo is activated again, so that the beam spot reaches to the original position prior to the backward jump. Reaching the original position, the reproduction of the disk resumes and the jump-on signal is negated. While the jump-on signal is asserted, the TE balance adjuster 52 detects the peak (TE_peak) and bottom (TE_bottom) values of the low-pass filtered tracking error signal provided by the low-pass filter 51 (S26).

The TE balance adjuster 52 then calculates the mean of the peak (TE_peak) and bottom (TE_bottom) values (i.e., (TE_peak+TE_bottom)/2) and updates the tracking error balance based on the mean value (S27). One method for updating the tracking error balance is to calculate the weighted average of the previous tracking error balance and the newly calculated mean value. To prevent an abrupt change in the tracking error balance value, the previous tracking error balance is weighted more than the newly calculated mean value. For example, the equation for obtaining a new tracking error balance value ($TE\_bal_{NOW}$) may be given as:

$$TE\_bal_{NOW} = 0.75 \times TE\_bal_{PREV} + 0.25 \times (TE\_peak_{NOW} + TE\_bottom_{NOW})/2.$$

On the other hand, if a rapid update of the tracking error balance is required for rapidly reflecting the condition of the disk, the newly calculated mean value is weighted more than the previous tracking error balance. In this regard, the weight values can be X and (1−X), where X is between 0 and 1.

The TE balance adjuster 52 outputs the updated tracking error balance value 303, which is to be subtracted from the E–F signal, thereby allowing the update of the tracking error balance during the data reproduction. The TE balance adjustment process is repeated, e.g., periodically, as needed, or continuously, until the reproduction is terminated (S28).

In order to secure a time for the tracking error balance adjustment, the microprocessor 53 may perform the reproduction of the optical disk with a speed higher than a required one. For example, if a 1×-speed reproduction (1×: basic reproduction speed) of real-time A/V data is required, the microprocessor 53 performs a 4×-speed reproduction, thereby securing a spare time that can be utilized for the tracking error balance adjustment. In this case, if the time required for full data buffering is T, spare time as much as 3T can be used for the tracking error balance adjustment. After the spare time of 3T elapses, the suspended data reproduction resumes.

Figure 7:
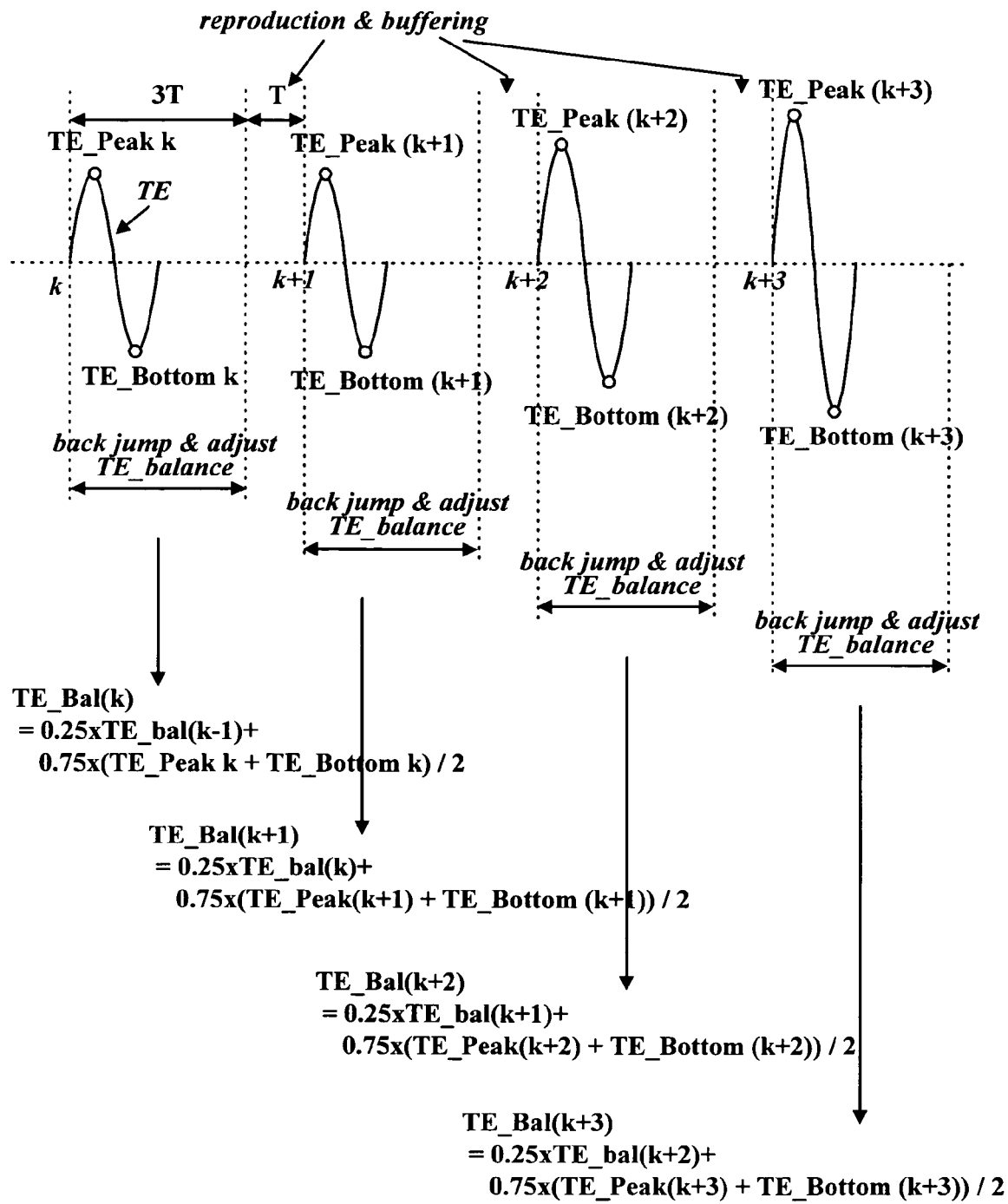
FIG. 7 illustrates an exemplary process of the tracking error balance adjustment in accordance with the second embodiment of the present invention.

FIG. 7 illustrates an exemplary process of the tracking error balance adjustment in accordance with the second embodiment of the present invention. As shown in FIG. 7, the process of track-back-jumping and adjusting the TE balance can be repeatedly performed at different times K, K+1, K+2, K+3, etc., to variably and optimally adjust the TE balance at different stages of the data reproduction. It is possible to perform the adjustment intermittently rather than periodically as shown in FIG. 7.

Alternatively, the tracking error balance adjustment may be performed during a search operation according to a request from the user. In this case, the microprocessor 53 asserts the jump-on signal during the long jump operation. While the jump-on signal is asserted, the TE balance adjuster 52 detects the peak and bottom values of the E–F signal and conducts the aforementioned TE balance adjustment steps.

The servo systems of FIGS. 3 and 5 can be implemented in a disk reproducing/recording device. In one example, the systems of FIGS. 3 and 5 can be provided as the tracking error detector 12 and/or the focus error detector 11 of FIG. 1.

The method and apparatus for adjusting tracking error balance in an optical disk reproducing apparatus in accordance with the present invention allows stable tracking performance even with a skewed optical disk by adaptively adjusting the tracking error balance.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method of adjusting a tracking error balance, comprising:
    pre-setting a tracking error balance for an optical recording medium; and
    adjusting the tracking error balance during reproduction of data from the optical recording medium by:
        determining a first average being an average of focus drive signal values of a previous focus drive signal;
        determining a second average being an average of focus drive signal values of a current focus drive signal; and
        adjusting the tracking error balance using the first and second averages by:
            calculating a difference between the first and second averages;
            multiplying the difference by a coefficient; and
            adding a result of the multiplying step to a current tracking error balance to produce an updated tracking error balance.

2. The method of claim 1, wherein the adjusting step is repeatedly performed during the reproduction of data from the optical recording medium.

3. The method of claim 1, wherein the optical recording medium is an optical disc.

4. An apparatus for adjusting a tracking error balance, comprising:
    a servo unit configured to control reproduction of data from an optical recording medium;
    a controller configured to pre-set a tracking error balance for the optical recording medium; and
    an adjuster configured to adjust the tracking error balance during the reproduction of data from the optical recording medium by:
        determining a first average being an average of focus drive signal values of a previous focus drive signal;
        determining a second average being an average of focus drive signal values of a current focus drive signal; and
        adjusting the tracking error balance using the first and second averages by:
            calculating a difference between the first and second averages;
            multiplying the difference by a coefficient; and
            adding a result of the multiplying step to a current tracking error balance to produce an updated tracking error balance.

* * * * *